July 9, 1929.  J. HARRIS  1,720,043
BLOWPIPE
Filed May 4, 1925    2 Sheets-Sheet 1
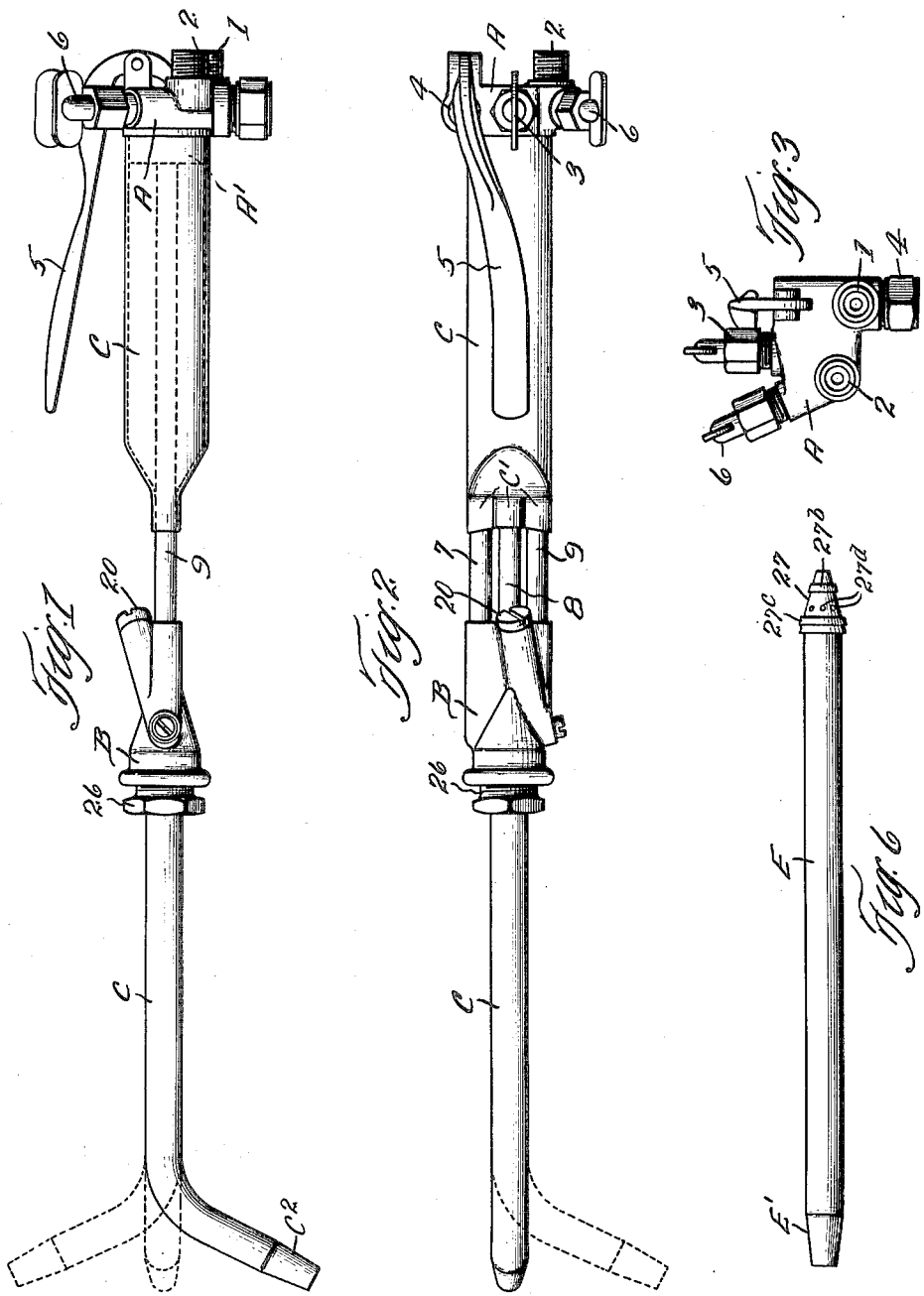

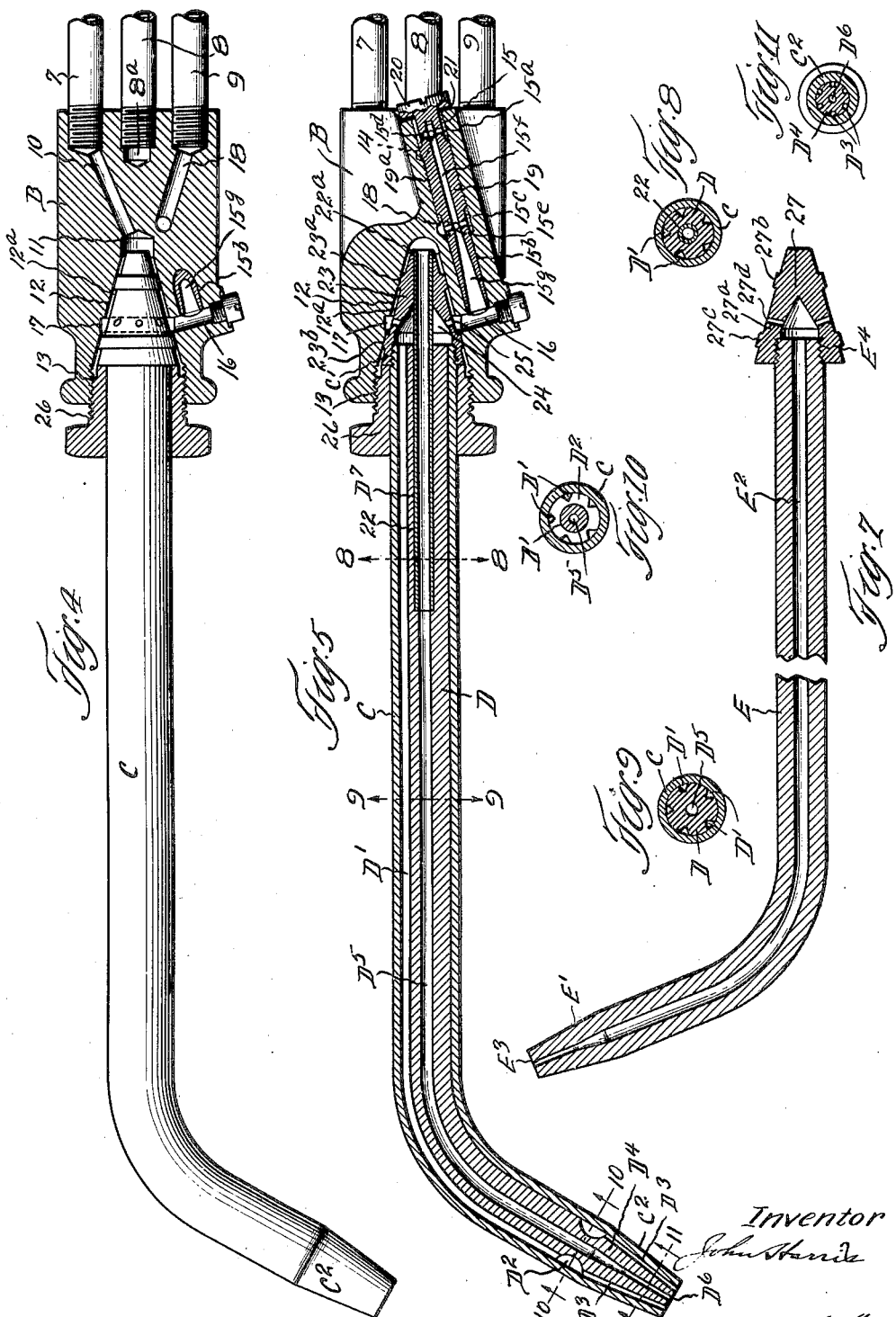

Patented July 9, 1929.

1,720,043

UNITED STATES PATENT OFFICE.

JOHN HARRIS, OF CLEVELAND, OHIO, ASSIGNOR TO THE HARRIS CALORIFIC COMPANY, OF CLEVELAND, OHIO, A CORPORATION OF OHIO.

BLOWPIPE.

Application filed May 4, 1925. Serial No. 27,758.

This invention relates to blowpipes, and has for its general object to increase the efficiency of such devices. A further object of the invention is to provide a blowpipe having a tip detachably connected to a head, wherein the head and the connections between the head and tip are so located as to be removed from the zone of heat, thereby preventing injury, due to such heat, to the head and connections. A still further object of the invention is to provide a pipe of this character in which the liability of the flame to "flash back" within the pipe will be reduced to a minimum and, should such action occur, the flame will be extinguished and the wave of propagation will be directed toward the delivery end of the pipe without injuring the parts of the pipe. Still further objects of the invention are to improve the construction of the head to which the tips are detachably connected; to provide an adjustable connection between the tips and the head which will permit the ready assembling and dissembling of the head and tips and which will enable the tips to be adjusted quickly and conveniently to various operating positions; to provide a blowpipe which may be used alike for cutting and welding operations and which will perform both said operations in a most efficient manner. A final object of the invention is to provide a blowpipe having the various capabilities of operation referred to hereinbefore and which is comparatively cheap of production.

I accomplish the foregoing objects in and through the construction and arrangement of parts shown in the drawings, wherein Fig. 1 represents a side elevation and Fig. 2 a plan view of a blowpipe constructed in accordance with my invention; Fig. 3 a rear elevation of the valve block; Fig. 4 a view, partly in elevation and partly in section, of the tip and head of my pipe, the section showing the connections and passages whereby oxygen and combustible gas are delivered to and through said head; Fig. 5 a longitudinal sectional view through the tip shown in the preceding figure and through a portion of the head, axially of the mixing device; Fig. 6 a side elevation of a straight welding tip which may be used with said pipe; Fig. 7 a longitudinal sectional view through a curved or bent welding tip which may also be used with my pipe; and Figs. 8, 9, 10 and 11 are sectional views corresponding respectively to the lines 8—8, 9—9, 10—10 and 11—11 of Fig. 5.

Describing the various parts by reference characters, A represents the rear valve block and B the head of the blowpipe. The valve block A is provided with connections 1 and 2 for supplying oxygen and a combustible gas respectively thereto; also with a valve 3 for controllnig the supply of preheating oxygen therethrough; a valve 4 operated by a lever 5 for controlling the supply of cutting oxygen therethrough, and a valve 6 for controlling the supply of combustible gas therethrough. The details of construction of the block A and of the particular means for controlling the supply of oxygen and combustible gas therethrough constitute no part of the invention intended to be covered hereby.

Extending from the valve block A are pipes 7, 8 and 9 which conduct, respectively, cutting oxygen, preheating oxygen, and combustible gas from the said block to the head B. A handle casing C is fitted at its rear end upon the forward end A' of the valve block and has its front end swaged about the tubes 7, 8 and 9, as shown at C'. The pipes 7, 8 and 9 are shown as threaded into short connections at the rear end of the head block B. From the connection for the pipe 7 a passage 10 extends to a chamber 11, said chamber constituting an extension of a tapered frusto-conical bore 12 formed in the front of the head, the tapered bore 12 merging at its front end with a short threaded bore 13. From the short connection 8ª which receives the front end of the pipe 8 a passage 14 extends to the rear portion of a bore 15 in the said head, the front or delivery end of said bore communicating with a passage 16 which communicates at its delivery end with an annular recess 17 projecting from the tapered bore 12.

From the connection for the pipe 9, a passage 18 delivers the combustible gas into the bore 15 at a point in front of the passage 14 and at a point remote from the front of said bore.

The bore 15 is threaded in its rear part, and mounted therein is a mixer 19 having a head 20 at the rear end thereof adapted to engage a washer 21 interposed between the front face of said head and a seat on the head B surrounding the bore 15. The stem of the mixer 19 is reduced in diameter for a short distance in front of the head 20, thereby providing an annular chamber $15^a$ into which the passage 14 discharges. In front of such reduced portion, the mixer 19 is enlarged and provided with a thread $19^a$ adapted to engage the threaded interior of the bore 15. The front portion of the mixer 19 is reduced in diameter and fits within the reduced front end $15^b$ of the bore 15. The passage 18 communicates with an annular chamber $15^c$ provided in the enlarged threaded portion of the bore 15 in front of the threaded portion of the mixer; and the mixer is provided with ports $15^d$ communicating with the chamber $15^a$ and with ports $15^e$ communicating with the chamber $15^c$, the inner ends of the ports discharging into the bore $15^f$ of said mixer, said bore extending from the rear portion of the mixer to the front end thereof. It should be noted that, in front of the ports $15^e$, the bore of the mixer is gradually enlarged in diameter, providing a bore section $15^g$ of progressively increasing cross sectional area extending to the delivery end of the mixer.

As blowpipes have been constructed heretofore, the tips are so connected and located with respect to the heads that the heads, and particularly the parts thereof to which the tips are connected, are subjected to heat of such intensity (developed by the operation of the blowpipes) as to injure the heads and connections. I so construct and connect my tips and heads that, while I am enabled to operate the pipes with increased efficiency, the heads and connections are not subjected to the injurious effect of the heat of operation.

Referring particularly to one of my cutting tips, the same comprises an outer tubular member C and an inner tubular member D. Each of these members is made preferably of practically pure copper. The outer member is provided with an external thread C' at its rear end and has its front or delivery end tapered to frusto conical form by a swaging operation, as indicated at $C^2$.

The inner tubular member D has a suitable number of longitudinal grooves D' formed in the exterior thereof. These grooves may be of any desired shape, it being preferred to use V-shaped grooves such as covered in my Patent No. 1,408,194, issued February 28, 1922.

The grooves D' extend from the rear end of the inner member to an annular recess $D^2$, near the front thereof, the said recess forming a distributing chamber with the outer member, when the two members are assembled. From this recess, smaller grooves $D^3$ extend to the delivery end of the inner member. It should be noted that the lower end $D^4$ of the inner member which contains the grooves $D^3$ is also swaged so as to give a frusto-conical shape thereto adapting it to fit closely within the lower end of the outer member. As this swaging operation tends to close and unduly restrict the delivery end of the central bore $D^5$, the delivery portion $D^6$ of such bore is drilled to the appropriate size after the swaging operation.

The rear end of the bore $D^5$ is enlarged, as shown at $D^7$, and a tube 22 is fitted tightly into such enlarged part, the bore of the said tube being preferably the same as that of the bore $D^5$. This tube projects rearwardly beyond the end of the inner member D, for a purpose to be explained hereinafter.

The inner and outer members being still straight or unbent, the inner member is driven or forced into the outer member, and the lower or delivery ends of said members are ground for the purpose of finishing such ends and for the removal of burrs, projections or other inequalities. After the two members have been so assembled, the tip will be bent to the shape shown in Figs. 1, 2, 4, 5 and 6, being bent upon a wheel or roll to give the proper shape or curvature thereto.

Threaded onto the rear end of the outer member C is a tapered connecting body 23, the said body having a chamber 24 in its front portion communicating with the rear ends of the passages formed by the grooves D' and the surrounding wall of the outer tip member. The body is provided with a bore, extending rearwardly from this chamber, which is adapted to receive and form a close fit with the rear end of the tube 22, the rear end being expanded outwardly, at $22^a$, to lock the tube and body together and to prevent any leakage of gas around said tube from one of these chambers 11, 24, to the other of said chambers. The body 23 is frusto-conical in shape and is provided with a rear annular tapered bead $23^a$ and a front annular tapered bead $23^b$ which, when the said body and the attached tip members are forced rearwardly, will engage and form a tight fit with corresponding parts of the bore 12. The beads $23^a$ and $23^b$ are so located that the former bead defines the front of the chamber 11 and both beads define therebetween an annular chamber $12^a$ from which the annular recess 17 projects.

The tip is detachably secured in place within the head by means of a sleeve nut 26, which is applied to the outer tip member before the body 23 is secured thereto and which sleeve nut is threaded into the bore 13 and, engaging the front end of the body 23, serves to force said body and the attached tip rearwardly, forcing the beads on said body to their seats within the bore 12. By slacking up on the sleeve nut, the tip may be rotatably adjusted to any desired position, as indicated in Figs. 1 and 2, after which it may be quickly and conveniently clamped in such adjusted position by setting up the nut.

The annular chamber 12, 17 receives the preheating mixture supplied through the mixer 19 and delivers the same through ports 25 in the body 23 into the chamber 24, whence the preheating mixture is conducted to the delivery end of the tip. Cutting oxygen is delivered from the passage 10 into chamber 11 and thence to the central bore of the inner member D.

In Figs. 6 and 7 there is shown a welding tip which may be employed with the head B, the tips being identical in construction except that the former tip is straight and the latter tip has been bent in the same manner as the cutting tips shown in Figs. 1, 2, 4 and 5. In these views, E represents the welding tip, having a tapered end E', formed by swaging. $E^2$ denotes the main passage or bore of the tip the delivery end $E^3$ of the bore being drilled to the desired size after the swaging operation, as is the case with the delivery end of the bore for cutting oxygen in the cutting tip. The rear end of each of the welding tips shown herein is provided with a thread $E^4$, this threaded end being provided for the reception of the body 27, which is identical in construction with the body 23 except that it is not provided with a bore extending rearwardly from the chamber $27^a$. It is, however, provided with the annular tapered or beveled beads $27^b$, $27^c$, with ports $27^d$ for admitting the mixture of oxygen and combustible gas to the chamber $27^a$. In using the welding tips, it is necessary only to apply a sleeve nut 26 thereto, the sleeve nut serving to seat the body 27 and the attached tip in the same manner that the body 23 and its attached tip are seated by said nut in Figs. 4 and 5.

In the cutting tip, the passages formed by the grooves $D^3$ and the surrounding portion $C^2$ of the outer tip member make each an angle of from six to seven degrees with the axis of the tip and with the oxygen-delivery passage $D^6$. By imparting this particular inclination to the preheating orifices, the front or operating end of the tip may be placed in close proximity to the work, and the preheating flames or cones will converge to heat the particular spot against which the cutting oxygen is to be directed. This effects a marked saving of time in the preheating operation, with an accompanying saving in consumption of the preheating gases.

Reference has been made hereinbefore to the particular shape of the bore of the mixer 19. While a blowpipe constructed in the manner shown and described herein will reduce to a minimum the liability of a "flash back", should such action occur and the flame be transmitted backward into the passage 16, considerable room for expansion of the propagation-wave is provided in the chambers 17 and $12^a$, in the passage and the enlarged part $15^g$ of the mixer bore. Should the flame not be extinguished in this space, it will not pass backward through the contracted part $15^f$ of the mixer bore, but will be extinguished therein, and the wave will be directed forwardly from such point of extinguishment.

In operating my blowpipe with the welding tip, it is necessary only to secure such tip in place in the manner described hereinbefore, the mixture of combustible gas and oxygen being supplied to the bore of said tip in the same manner as it is supplied to the preheating passages of the cutting torch—it being unnecessary, of course, to operate the lever 5, since no cutting oxygen can be supplied to the welding tip, even should the lever be accidentally or unintentionally operated.

It will be observed that, by constructing a tip and locating the head B in the manner shown in Figs. 1–4, the head and the connections for securing the tip thereto are removed from the detrimental influence of the heat of operation and that the zone of bending of the tip corresponds to the location of the head of ordinary cutting blowpipes. Furthermore, I am enabled to cut metal in the ordinary manner and also to cut off rivet heads, using the same tip for both purposes; whereas, in ordinary blowpipes it is necessary to employ a special design of rivet-cutting tip when it is desired to use such pipes for this purpose. I secure this advantage by eliminating a head at the point where my tips are bent, this point being at approximately the same distance from the delivery end of the tip as the heads of ordinary blowpipes are located.

Having thus described my invention, what I claim is:

1. In a blowpipe, the combination of a head having connections for supplying thereto a combustible gas and cutting oxygen and preheating oxygen; the said head having at the end opposite the said connections a tapered or frusto-conical bore with its smaller end presented rearwardly or toward said connections, said head having therein a passage for supplying cutting oxygen to such smaller end of said bore and passages for delivering a mixture of preheating oxygen and combustible gas to another portion of said bore, a tip having outer passages for the preheating mixture and a central bore for cutting oxygen, a body connected to the rear end of said tip and having a chamber at the rear of and communicating with the outer passages thereof, the central bore of the said tip being enlarged adjacent to the rear end of the tip and there being a tube fitted in such enlarged portion and extending rearwardly through the said body and forming a tight joint therewith, the said body being provided with a pair of longitudinally spaced annular beads adapted to contact with correspondingly spaced portions of the tapered bore and form therewith an annular chamber to which the aforesaid mixture is delivered, there being ports in said body establishing communication between the said annular chamber and the first mentioned chamber, and means for connecting the said tip to the said head and for forcing the beads on said body to their seats within the tapered bore of the head.

2. In a blowpipe, the combination of a head having connections for supplying thereto a combustible gas and cutting oxygen and preheating oxygen, the said head having at the end opposite the said connections a tapered or frusto-conical bore with its smaller end presented rearwardly or toward said connections, said head having therein a passage for supplying cutting oxygen to such smaller end of said bore and passages for delivering a mixture of preheating oxygen and combustible gas to another portion of said bore, a tip having outer passages for the preheating mixture and a central bore for cutting oxygen, a body connected to the rear end of said tip and having a chamber at the rear of and communicating with the outer passages thereof, there being a tube fitted in the rear portion of the central bore of said tip and extending rearwardly through the said body and forming a tight joint therewith, the said body being provided with a pair of longitudinally spaced annular beads adapted to contact with correspondingly spaced portions of the tapered bore and form therewith an annular chamber to which the aforesaid mixture is delivered, there being ports in said body establishing communication between the said annular chamber and the first mentioned chamber, and means for connecting the said tip to the said head and for forcing the beads on said body to their seats within the tapered bore of the head.

3. In a blowpipe, the combination of a head having connections for supplying thereto a combustible gas and cutting oxygen and preheating oxygen, the said head having at the end opposite said connections a tapered or frusto-conical bore with its smaller end presented rearwardly or toward said connections, said head having therein a passage for supplying cutting oxygen to such smaller end of said bore and passages for delivering a mixture of preheating oxygen and combustible gas to another portion of said bore, a tip having a central bore for cutting oxygen and passages located outside the said central bore for the preheating mixture, a body connected to the rear end of said tip and having a chamber at the rear of and communicating with the outer passages in the said tip, the said body being provided with a pair of annular spaced beads adapted to contact with correspondingly spaced portions of the tapered bore and to form therewith an annular chamber to which the aforesaid mixture is delivered, there being ports in said body establishing communication between the said annular chamber and the first mentioned chamber, means for connecting the said tip to the said head with the beads on said body engaging the tapered bore of said head, and means for delivering cutting oxygen from the smaller end of the bore in said head to the central bore of said tip.

4. In a blowpipe, the combination of a head having a bore, a mixing device mounted in said bore and having longitudinally spaced series of ports therethrough, the said head having a passage for conducting oxygen to one such series of ports and a second passage for conducting combustible gas to the other series of ports, the portion of the bore of said device which extends from the second series of ports to the delivery end of such device being of progressively increasing cross sectional area, means for connecting a tip to said head, and means for delivering the mixture formed in such device into the said tip.

5. In a blowpipe, the combination of a head having a bore, a mixing device mounted in said bore and having longitudinally spaced series of ports therethrough, the said head having a passage for conducting oxygen to one such series of ports and a second passage for conducting combustible gas to the other series of ports, the portion of the bore of said device which extends from the second series of ports to the delivery end of such device being of progressively increasing cross sectional area and delivering into a chamber, means for connecting a tip to said head, and means for delivering the mixture from said chamber into the said tip.

6. A head for blowpipes comprising a body having at the front or delivery end thereof means for securing a tip thereto and provided at its opposite end with connections for supplying thereto cutting oxygen, preheating oxygen, and a combustible gas, there being a passage in said head for delivering cutting oxygen to the appropriate bore or passage in the tip and the said head having a longitudinal rib or projection thereon provided with a bore, the said bore having a rear threaded portion and a front portion of smaller diameter, a mixing device having an intermediate portion adapted to be threaded into the said bore, the front and rear portions of the said mixing device being of less diameter than the threaded portion of said bore and the front portion thereof being adapted to fit the front unthreaded portion of the bore, the construction providing annular chambers at the front and at the rear of the threaded portion of said device, the said head being provided with a passage for conducting cutting oxygen to the rear annular chamber and with a passage for conducting combustible gas to the front annular chamber, the said mixing device having a restricted bore communicating with both of said chambers, the bore of said device being of progressively increasing cross sectional area from the connection thereof with the front annular chamber.

7. A head for blowpipes comprising a body having at the front or delivery end thereof means for securing a tip thereto and provided at its opposite end with connections for supplying thereto oxygen and a combustible gas, the said head being provided with a bore, the said bore having a rear threaded portion and a front portion of smaller diameter, a mixing device having an intermediate portion adapted to be threaded into the said bore, the front and rear portions of the said mixing device being of less diameter than the threaded portion of said bore and the front portion thereof being adapted to fit the front unthreaded portion of the bore, the construction providing annular chambers at the front and at the rear of the threaded portion of said device, the said head being provided with a passage for conducting cutting oxygen to the rear annular chamber and with a passage for conducting combustible gas to the front annular chamber, the said mixing device having a restricted bore communicating with both of said chambers, the bore of said device being of progressively increasing cross sectional area from the connection thereof with the front annular chamber.

In testimony whereof, I hereunto affix my signature.

JOHN HARRIS.